United States Patent
Steinbrenner et al.

(10) Patent No.: US 12,279,612 B2
(45) Date of Patent: Apr. 22, 2025

(54) AGROFORMULATION OF MICROCAPSULES WITH AN ANIONIC $C_6$—$C_{10}$ CODISPERSANT

(71) Applicant: BASF SE, Ludwigshafen am Rhein (DE)

(72) Inventors: Ulrich Steinbrenner, Limburgerhof (DE); Thorsten Volland, Limburgerhof (DE)

(73) Assignee: BASF SE, Ludwigshafen (DE)

( * ) Notice: Subject to any disclaimer, the term of this patent is extended or adjusted under 35 U.S.C. 154(b) by 460 days.

(21) Appl. No.: 16/320,642

(22) PCT Filed: Jul. 17, 2017

(86) PCT No.: PCT/EP2017/067964
§ 371 (c)(1),
(2) Date: Jan. 25, 2019

(87) PCT Pub. No.: WO2018/019629
PCT Pub. Date: Feb. 1, 2018

(65) Prior Publication Data
US 2019/0174750 A1   Jun. 13, 2019

(30) Foreign Application Priority Data

Jul. 27, 2016 (EP) ..................... 16181385

(51) Int. Cl.
*A01N 25/28* (2006.01)
*A01N 25/02* (2006.01)
*A01N 43/10* (2006.01)
*A01N 43/80* (2006.01)

(52) U.S. Cl.
CPC ............. *A01N 25/28* (2013.01); *A01N 25/02* (2013.01); *A01N 43/10* (2013.01); *A01N 43/80* (2013.01)

(58) Field of Classification Search
CPC ........ A01N 25/28; A01N 25/02; A01N 43/10; A01N 43/80
See application file for complete search history.

(56) References Cited

U.S. PATENT DOCUMENTS

| | | | | |
|---|---|---|---|---|
| 3,546,154 A | * | 12/1970 | Hwa | C08F 2/26 524/745 |
| 4,280,833 A | * | 7/1981 | Beestman | A01N 25/28 504/300 |
| 4,938,797 A | * | 7/1990 | Hasslin | B01J 13/16 504/359 |
| 5,292,835 A | | 3/1994 | Jahns et al. | |
| 6,156,803 A | * | 12/2000 | Curry | A01N 25/04 504/363 |
| 9,217,080 B2 | | 12/2015 | Jung et al. | |
| 2010/0248963 A1 | | 9/2010 | Becher et al. | |
| 2012/0129694 A1 | * | 5/2012 | Ditmarsen | A01N 25/28 504/107 |

FOREIGN PATENT DOCUMENTS

| | | |
|---|---|---|
| CN | 103153050 A | 6/2013 |
| DE | 102007055813 A1 | 6/2008 |
| EP | 0457154 B1 | 3/1994 |
| WO | WO-00/05952 A1 | 2/2000 |
| WO | 06024820 A1 | 3/2006 |
| WO | 06037945 A1 | 4/2006 |
| WO | 07071900 A1 | 6/2007 |
| WO | 07096576 A1 | 8/2007 |
| WO | 08071649 A2 | 6/2008 |
| WO | 12071248 A1 | 5/2012 |
| WO | WO-2014/169778 A1 | 10/2014 |
| WO | 16169683 A1 | 10/2016 |
| WO | 16202500 A1 | 12/2016 |
| WO | 16202659 A1 | 12/2016 |

OTHER PUBLICATIONS

International Search Report, issued in PCT/EP2017/067964, dated Aug. 9, 2017.
International Preliminary Report On Patentability, issued in PCT/EP2017/067964, dated Jan. 29, 2019.
Search Report, issued in EP Application No. 16181385.2, dated Nov. 16, 2018.

* cited by examiner

*Primary Examiner* — David Browe
(74) *Attorney, Agent, or Firm* — MARSHALL, GERSTEIN & BORUN LLP

(57) ABSTRACT

The present invention relates to an aqueous composition comprising in the aqueous phase microcapsules which comprise a shell and a core, where the core contains a pesticide; and a codispersant of the formula R—X, in which R has 6 to 10 carbon atoms and is alkyl, arylalkyl, or alkylaryl; X is —O—$PO_3H_2$, —$CO_2H$, —O—$SO_3H$, —$SO_3H$, or salts thereof. The invention further relates to a method of preparing the composition by synthesizing the microcapsules in the aqueous phase in the presence of the codispersant; and to a method of controlling phytopathogenic fungi and/or undesired plant growth and/or undesired insect or mite attack and/or for regulating the growth of plants, wherein the composition is allowed to act on the respective pests, their environment or the crop plants to be protected from the respective pest, on the soil and/or on undesired plants and/or on the crop plants and/or on their environment.

26 Claims, No Drawings

AGROFORMULATION OF MICROCAPSULES WITH AN ANIONIC $C_6$—$C_{10}$ CODISPERSANT

The present invention relates to an aqueous composition comprising in the aqueous phase microcapsules which comprise a shell and a core, where the core contains a pesticide; and a codispersant of the formula (I)

$$R-X \qquad (I)$$

in which R has 6 to 10 carbon atoms and is alkyl, arylalkyl, or alkylaryl; X is —O—$PO_3H_2$, —$CO_2H$, —O—$SO_3H$, —$SO_3H$, or salts thereof. The invention further relates to a method of preparing the composition by synthesizing the microcapsules in the aqueous phase in the presence of the codispersant; and to a method of controlling phytopathogenic fungi and/or undesired plant growth and/or undesired insect or mite attack and/or for regulating the growth of plants, wherein the composition is allowed to act on the respective pests, their environment or the crop plants to be protected from the respective pest, on the soil and/or on undesired plants and/or on the crop plants and/or on their environment. The preferred embodiments of the invention mentioned herein below have to be understood as being preferred either independently from each other or in combination with one another.

Aqueous agroformulations of pesticidal microcapsules are very useful products in crop protection.

Ina Maria et al. (Journal of Colloid and Interface Science, 478, 2016, p. 296-302) disclose the preparation of microcapsules in the presence of sodium 2-ethylhexyl sulfate in water.

WO 2012/071248 discloses aqueous herbicidal microcapsule suspensions.

It is an ongoing challenge to identify new formulations with improved properties.

The object was solved by an aqueous composition comprising in the aqueous phase
microcapsules which comprise a shell and a core, where the core contains a pesticide;
and a codispersant of the formula (I)

$$R-X \qquad (I)$$

in which
R has 6 to 10 carbon atoms and is alkyl arylalkyl, or alkylaryl;
X is —O—$PO_3H_2$, —$CO_2H$, —O—$SO_3H$, —$SO_3H$, or salts thereof.

The aqueous composition may comprise at least 15 wt %, preferably at least 25 wt %, and in particular at least 35 wt % water. The composition is usually a liquid at 20° C.

The composition comprises an aqueous phase, which is usually a continuous aqueous phase. The composition may comprise at least one further phase, such as at least one a discontinuous solid phase (e.g. the microcapsules, or suspended pesticide particles).

The composition comprises in the aqueous phase the microcapsules and the codispersant. Typically, the composition comprises in the continuous aqueous phase the microcapsules in form of as discontinuous phase, such as suspended microcapsules. Typically, the composition comprises in the continuous aqueous phase the codispersant in dissolved form.

The codispersant is usually soluble in water, e.g. at 20° C. to at least 10 g/l, preferably at least 50 g/l and in particular at least 100 g/l.

The composition comprises usually 0.5 to 50 g/l, preferably 1 to 30 g/l and in particular 2 to 15 g/l of the codispersant.

The weight ratio of the microcapsules to the codispersant is usually in the range from 400:1 to 20:1, preferably from 200:1 to 40:1, and in particular from 150:1 to 60:1.

R is usually a monovalent residue. Typically, R is a hydrocarbon (i.e. it is free of heteroatoms). The residue R has 6 to 10 carbon atoms, preferably 6 to 9, and in particular 6 to 8 carbon atoms. Preferably, R is free of heteroatoms. Preferably, R has 6 to 10 carbon atoms and is alkyl or alkylaryl. In particular, R has 6 to 10 carbon atoms and is alkyl.

The alkyl groups may be linear or branched, saturated or unsaturated. The alkyl group is preferably saturated. The alkyl group is preferably branched. Mixtures of different groups are also possible, such as mixtures of different alkyl chain lenghts, and/or of saturated and unsaturated groups.

The arylalkyl typically has a monovalent position on the alkyl moiety. Preferably, the aryl moiety in the alkylaryl is phenyl. In particular, the alkylaryl is phenylalkyl.

The alkylaryl typically has a monovalent position on the aryl moiety. Preferably, the aryl moiety in the alkylaryl is phenyl. In particular, the alkylaryl is alkylphenyl.

Typical examples for alkyl are linear or branched hexyl, heptyl, octyl (e.g. 2-ethylhexyl), nonyl or decyl, or mixture thereof. Where R is 2-ethylhexyl the formula (I) may correspond to $CH_3$—$(CH_2)_3$—$CH(Et)CH_2$—X.

Typical examples for a alkylaryl are linear or branched methylphenyl ($CH_3$-Ph), ethylphenyl (Et-PH-), propylphenyl (e.g. cumyl), or butylphenyl, or mixture thereof. Where R is cumyl the formula (I) may correspond to $(CH_3)_2CH$-Ph-X.

Preferably, R is a $C_6$-$C_8$ alkyl or $C_8$-$C_{10}$ alkylaryl.
More preferably, R is linear or branched $C_8$ alkyl or $C_9$ alkylaryl.

In particular, R is branched $C_8$ alkyl or cumyl. In another particular preferred form R is 2-ethyl hexyl.

X is preferably a salt of —O—$PO_3H_2$, —$CO_2H$, —O—$SO_3H$, —$SO_3H$. Suitable salts are alkali metal salts and/or alkaline earth metal salts and/or ammonium salts, for example the ammonium, sodium, potassium, calcium or magnesium salts. The sodium and potassium salts are preferred. It is understood that depending on the pH of the aqueous composition the protonated form may partially be deprotonated and form a salt.

X is more preferably —O—$SO_3H$ or —$SO_3H$, or salts thereof.

X is in particular —O—$SO_3H$, or a salt thereof.

In one possible form of the composition
R is linear or branched hexyl, heptyl, octyl, nonyl or decyl, methylphenyl, ethylphenyl, propylphenyl (e.g. cumyl), butylphenyl, or mixture thereof; and
X is —O—$PO_3H_2$, —$CO_2H$, —O—$SO_3H$, —$SO_3H$, or salts thereof.

In a preferred form of the composition
R is linear or branched hexyl, heptyl, octyl, methylphenyl, ethylphenyl, propylphenyl (e.g. cumyl) or mixture thereof; and
X is —O—$PO_3H_2$, —$CO_2H$, —O—$SO_3H$, —$SO_3H$, or salts thereof.

In another preferred form of the composition
R is linear or branched hexyl, heptyl, octyl, propylphenyl (e.g. cumyl) or mixture thereof; and
X is —O—$SO_3H$, —$SO_3H$, or salts thereof.

In another preferred form of the composition

R is linear or branched hexyl, heptyl, octyl, propylphenyl (e.g. cumyl) or mixture thereof; and X is —O—SO$_3$H or salts thereof when R is linear or branched hexyl, heptyl, octyl, and X is —SO$_3$H, or salts thereof when R is propylphenyl.

In another preferred form of the composition

R is branched hexyl, heptyl, octyl, propylphenyl (e.g. cumyl) or mixture thereof; and X is —O—SO$_3$H or salts thereof when R is branched hexyl, heptyl, octyl, and X is —SO$_3$H or salts thereof when R is propylphenyl.

In another preferred form of the composition

R is branched hexyl, heptyl, octyl, cumyl or mixture thereof; and

X is —O—SO$_3$H or salts thereof when R is branched hexyl, heptyl, octyl, and X is —SO$_3$H, or salts thereof when R is cumyl.

In another preferred form of the composition

R is branched octyl, cumyl or mixture thereof; and

X is —O—SO$_3$H or salts thereof when R is branched octyl, and X is —SO$_3$H, or salts thereof when R is cumyl.

In particular preferred form of the composition

R is linear or branched hexyl, heptyl, octyl, or mixture thereof; and

X is —O—SO$_3$H, or salts thereof.

In another particular preferred form of the composition

R is branched hexyl, heptyl, octyl or mixture thereof; and

X is —O—SO$_3$H, or salts thereof.

In another particular preferred form of the composition

R is branched octyl or mixture thereof; and

X is —O—SO$_3$H, or salts thereof.

In another particular preferred form of the composition

R is 2-ethylhexyl; and

X is —O—SO$_3$H, or salts thereof.

The microcapsules comprise a shell and a core, where the core contains a pesticide. The core comprises the pesticide, and preferably also a solvent. The pesticide may be present in the core in dissolved form, as suspension, emulsion or suspoemulsion. Preferably, the pesticide is present in dissolved form. The core usually contains at least 10 wt %, preferably at least 30 wt % and in particular at least 50 wt % of the pesticide, based on the total amount of the core materials. The core may contain up to 100 wt %, preferably up to 70 wt % of the pesticide. The amount of core materials is typically summed up from the amounts of all pesticides and any solvents in the core.

The core of the microcapsules optionally comprises a solvent, preferably a water-immiscible solvent. Preferably, the solvent has a solubility in water of up to 20 g/l at 20° C., more preferably of up to 5 g/l and in particular of up to 0.5 g/l. Usually, the solvent has a boiling point above 100° C., preferably above 150° C., and in particular above 180° C. (at 1 bar). "Solvent" in this case typically means that the solvent is able to form a homogeneous mixture with the pesticide or dissolve it. Examples for suitable organic solvents are mineral oil fractions of medium to high boiling point, such as kerosene or diesel oil, furthermore oils of vegetable or animal origin, fatty acid glycerides or their methyl or ethyl ester derivatives, commonly called methyl- or ethyl oleate, aliphatic, cyclic and aromatic hydrocarbons, e.g., toluene, xylene, paraffin, tetrahydronaphthalene, alkylated naphthalenes or their derivatives. Mixtures of organic solvents may also be used. Preferred organic solvents are fatty acid glycerides or their methyl or ethyl ester derivatives, and/or a hydrocarbons (e.g. aromatic hydrocarbons).

The core may optionally contain auxiliaries, such as organic modified polysiloxanes such as Break Thru S 240®; alcohol alkoxylates such as Atplus® 245, Atplus® MBA 1303, Plurafac® LF 300 and Lutensol® ON 30; EO/PO block polymers, Poloxamers, e.g., Pluronic® RPE 2035 and Genapol® B; alcohol ethoxylates such as Lutensol® XP 80; and dioctyl sulfosuccinate sodium such as Leophen® RA).

The weight ratio of the pesticide in the core (or of the sum of all pesticides in case more than one is present in the core) to the sum of all solvents in the core is typically from 5:1 to 1:10, preferably from 3:1 to 1:2, more preferably from 2:1 to 1:1.

The microcapsules comprises a shell, which may be made of any known shell material (e.g. polyacrylates, polystyrenes, melamin formaldehyde condensates and polyaddition products of isocyanates, in particular polyureas). Preferably, the shell is a polyurea shell or poly(meth)acrylate shell. In particular, the shell is a polyurea shell.

Poly(meth)acrylate is a known shell material for microcapsules, for example from WO 2008/071649, EP 0 457154 or DE 10 2007 055 813. Usually, the poly(meth)acrylate comprises $C_1$-$C_{24}$ alkyl esters of acrylic and/or methacrylic acid, acrylic acid, methacrylic acid, and/or maleic acid in polymerized form. More preferably, the poly(meth)acrylate comprises methyl methacrylate and methacrylic acid. The poly(meth)acrylate may also comprise in polymerized form one or more difunctional or polyfunctional monomers. The poly(meth)acrylate may further comprise other monomers.

More preferably, the poly(meth)acrylate polymer is synthesized from 30 to 100 wt %, based on the total weight of the monomers, of one or more monomers (monomers I) from the group comprising $C_1$-$C_{24}$ alkyl esters of acrylic and/or methacrylic acid, acrylic acid, methacrylic acid, and maleic acid, 10 to 70 wt %, based on the total weight of the monomers, of one or more difunctional or polyfunctional monomers (monomers II), and 0 to 40 wt %, based on the total weight of the monomers, of one or more other monomers (monomers III).

The poly(meth)acrylate of the capsule wall comprise generally at least 30%, in a preferred form at least 40%, in a particularly preferred form at least 50%, more particularly at least 60%, with very particular preference at least 70%, and also up to 100%, preferably not more than 90%, more particularly not more than 85%, and, with very particular preference, not more than 80%, by weight, of at least one monomer from the group comprising $C_1$-$C_{24}$ alkyl esters of acrylic and/or methacrylic acid, acrylic acid, methacrylic acid, and maleic acid (monomers I), in copolymerized form, based on the total weight of the monomers.

Furthermore the poly(meth)acrylate of the capsule wall comprises preferably at least 10%, preferably at least 15%, preferentially at least 20%, and also, in general, not more than 70%, preferably not more than 60%, and with particular preference not more than 50%, by weight, of one or more difunctional or polyfunctional monomers (monomers II), in copolymerized form, based on the total weight of the monomers. In another preferred embodiment, the poly(meth)acrylate of the capsule wall comprises preferably at least 10%, preferably at least 15%, and also, in general, not more than 50%, preferably not more than 40% by weight, of one or more polyfunctional monomers (monomers in copolymerized form, based on the total weight of the monomers.

Additionally, the poly(meth)acrylate may comprise up to 40%, preferably up to 30%, more particularly up to 20%, by weight, of other monomers III, in copolymerized form. The capsule wall is preferably synthesized only from monomers of groups I and II.

Suitable monomers I are $C_1$-$C_{24}$ alkyl esters of acrylic and/or methacrylic acid and also the unsaturated $C_3$ and $C_4$ carboxylic acids such as acrylic acid, methacrylic acid, and also maleic acid. Suitable monomers I are isopropyl, isobutyl, secbutyl, and teatbutyl acrylates and the corresponding methacrylates, and also, with particular preference, methyl, ethyl, npropyl, and n-butyl acrylates and the corresponding methacrylates. In general the methacrylates and methacrylic acid are preferred.

According to one preferred embodiment the microcapsule walls comprise 25% to 75% by weight of maleic acid, methacrylic acid and/or acrylic acid, more particularly methacrylic acid, based on the total amount of the monomers I, in copolymerized form.

Suitable monomers H are difunctional or polyfunctional monomers. By difunctional or polyfunctional monomers are meant compounds which have at least two nonconjugated ethylenic double bonds. Contemplated primarily are divinyl monomers and polyvinyl monomers. They bring about crosslinking of the capsule wall during the polymerization. In another preferred embodiment, suitable monomers II are polyfunctional monomers.

Suitable divinyl monomers are divinylbenzene and divinylcyclohexane. Preferred divinyl monomers are the diesters of diols with acrylic acid or methacrylic acid, and also the diallyl and divinyl ethers of these diols. Mention may be made, by way of example, of ethanediol diacrylate, ethylene glycol dimethacrylate, 1,3-butylene glycol dimethacrylate, methallylmethacrylamide, allyl acrylate, and allyl methacrylate. Particular preference is given to propanediol, 1,4-butanediol, pentanediol, and hexanediol diacrylates and the corresponding methacrylates.

Preferred polyvinyl monomers are the polyesters of polyols with acrylic acid and/or methacrylic acid, and also the polyallyl and polyvinyl ethers of these polyols, trivinylbenzene and trivinylcyclohexane. Particular preference is given to trimethylolpropane triacrylate and trimethacrylate, pentaerythritol triallyl ether, pentaerythritol tetraallyl ether, pentaerythritol triacrylate, and pentaerythritol tetraacrylate, and also their technical mixtures.

Monomers III contemplated are other monomers, different than the mononers I and II, such as vinyl acetate, vinyl propionate, vinylpyridine, and styrene or α-methylstyrene. Particular preference is given to itaconic acid, vinylphosphonic acid, maleic anhydride, 2-hydroxyethyl acrylate and methacrylate, acrylamido-2-methylpropanesulfonic acid, methacrylonitrile, acrylonitrile, methacrylamide, N-vinylpyrrolidone, N-methylolacrylamide, N-methylolmethacrylamide, dimethylaminoethyl methacrylate, and diethylaminoethyl methacrylate.

Polyurea is also a known shell material for microcapsules. They are preferably prepared by an interfacial polymerization process of a suitable polymer wall forming material, such as a polyisocyanate and a polyamine. Interfacial polymerization is usually performed in an aqueous oil-in-water emulsion or suspension of the core material containing dissolved therein at least one part of the polymer wall forming material. During the polymerization, the polymer segregates from the core material to the boundary surface between the core material and water thereby forming the wall of the microcapsule. Thereby an aqueous suspension of the microcapsule material is obtained.

In general, polyurea is formed by reacting a polyisocyanate having at least two isocyanate groups with a polyamine having at least two primary amino groups to form a polyurea wall material. However, preferred is if either the polyisocyanate or the polyamine or both have more than two reactive —NCO— or NH-groups, respectively. In a further embodiment, the polyurea may be formed by contacting polyisocyanate with water. Also, and preferably, the polyurea results from a reaction of polyisocyanate with both polyamine and water. Preferably, the polyurea shell contains a polyisocyanate and a polyamine in polycondensed form. Suitable polyisocyanates are known, e.g. from US 2010/0248963 A1, paragraphs [0135] to [0158], to which full reference is made. Suitable polyamines are known, e.g. from US 2010/0248963 A1, paragraphs [0159] to [0169], to which full reference is made.

Polyisocyanates may be used individually or as mixtures of two or more polyisocyanates. Suitable polyisocyanates are for example aliphatic isocyanates or aromatic isocyanates. These isocyanates may be present as monomeric or oligomeric isocyanates. The NCO content may be determined according to ASTM D 5155-96 A.

Examples of suitable aliphatic diisocyanates include tetramethylene diisocyanate, pentamethylene diisocyanate and hexamethylene diisocyanate as well as cycloaliphatic isocycantates such as isophoronediisocyanate, 1,4-bisisocyanatocyclohexane and bis-(4-isocyanatocyclohexyl)methane.

Suitable aromatic isocyanates include toluene diisocyanates (TDI: a mixture of the 2,4- and 2,6-isomers), diphenylmethene-4,4'-diisocyanate (MDI), polymethylene polyphenyl isocyanate, 2,4,4'-diphenyl ether triisocyanate, 3,3'-dimethyl-4,4'-diphenyl diisocyanate, 3,3'-dimethoxy-4,4'-diphenyl diisocyanate, 1,5-naphthylene diisocyanate and 4,4',4"-triphenylmethane triisocyanate. Also suitable are higher oligomers of the aforementioned diisocyanates such as the isocyanurates and biurethes of the aforementioned diisocyanates and mixtures thereof with the aforementioned diisocyanates.

In another preferred embodiment, the polyisocyanate is an oligomeric isocyanates, preferably an aromatic, oligomeric isocyanate. Such oligomeric isocyanates may comprise above mentioned aliphatic diisocyanates and/or aromatic isocyanates in oligomerized form. The oligomeric isocyanates have an average functionality in the range of 2,0 to 4,0, preferably 2,1 to 3,2, an more preferably 2,3 to 3,0. Typically, these oligomeric isocyanates have a viscosity (determined according to DIN 53018) in the range from 20 to 1000 mPas, more preferably from 80 to 500 mPas and especially from 150 to 320 mPas. Such oligomeric isocyanates are commercially available, for example from BASF SE under the tradenames Lupranat® M10, Lupranat® M20, Lupranat® M50, Lupranat® M70, Lupranat® M200, Lupranat® MM103 or from Bayer AG as Basonat® A270.

Also suitable are adducts of diisocyanates with polyhydric alcohols, such as ethylene glycol, glycerol and trimethylolpropane, obtained by addition, per mole of polyhydric alcohol, of a number of moles of diisocyanate corresponding to the number of hydroxyl groups of the respective alcohol and mixtures thereof with the aforementioned diisocyanates. In this way, several molecules of diisocyanate are linked through urethane groups to the polyhydric alcohol to form high molecular weight polyisocyanates. A particularly suitable product of this kind, DESMODUR® L (Bayer Corp., Pittsburgh), can be prepared by reacting three moles of toluene diisocyanate with one mole of 2-ethylglycerol (1,1-bismethylolpropane). Further suitable products are obtained by addition of hexamethylene diisocyanate or isophorone diisocyanate with ethylene glycol or glycerol.

Preferred polyisocyanates are isophorone diisocyanate, diphenylmethane-4,4'-diisocyanate, toluene diisocyanates, and oligomeric isocyanates, whereas oligomeric isocyanates are in particular preferred.

Suitable polyamines within the scope of this invention will be understood as meaning in general those compounds that contain two and more amino groups in the molecule, which amino groups may be linked to aliphatic or aromatic moieties.

Examples of suitable aliphatic polyamines are $\alpha,\omega$-diamines of the formula $H_2N$—$(CH_2)_p$—$NH_2$, wherein p is an integer from 2 to 6. Exemplary of such diamines are ethylene diamine, propylene-1,3-diamine, tetramethylene diamine, pentamethylene diamine and hexamethylene diamine. A preferred diamine is hexamethylene diamine. Further suitable aliphatic polyamines are polyethylenimines of the formula $H_2N$—$(CH_2$—$CH_2$—$NH)_q$—$H$, wherein q is an integer from 2 to 20, preferably 3 to 5. Representative examples of such polyethylenimines are diethylene triamine, triethylene tetramine, tetraethylene pentamine and pentaethylene hexamine. Further suitable aliphatic polyamines are dioxaalkane-$\alpha,\omega$-diamines, such as 4,9-dioxadodecane-1,12-diamine of the formula $H_2N$—$(CH_2)_3O$—$(CH_2)_4O$—$(CH_2)_3$—$NH_2$.

Examples of suitable aromatic polyamines are 1,3-phenylene diamine, 2,4- and 2,6-toluene diamine, 4,4'-diaminodiphenyl methane, 1,5-diaminonaphthalene, 1,3,5-triaminobenzene, 2,4,6-triaminotoluene, 1,3,6-triaminonaphthalene, 2,4,4'-triaminodiphenyl ether, 3,4,5-triamino-1,2,4-triazole and 1,4,5,8-tetraaminoanthraquinone, Those polyamines which are insoluble or insufficiently soluble in water may be used as their hydrochloride salts.

Polyamines, such as those mentioned above may be used individually or as mixtures of two or more polyamines. Preferred polyamine is a polyethylenimine, such as tetraethylene pentamine.

The relative amounts of each complementary wall-forming component will vary with their equivalent weights. In general, approximately stoichiometric amounts are preferred, while an excess of one component may also be employed, especially an excess of polyisocyanate. The total amount of wall-forming components approximately corresponds to the total amount of polymeric wall-forming materials.

The microcapsules contain up to 15 wt %, preferably up to 10 wt % and in particular up to 6 wt % of shell (e.g. based on the total amount of pesticide, all solvents in the core, polyisocyate, and polyamine). The microcapsules contain usually at least 0.5 wt %, preferably at least 1.5 wt % shell. In another form the microcapsules contain up to 15 wt %, preferably up to 10 wt % and in particular up to 6 wt % of shell (e.g. based on the total amount of benzoxazinone of formula (I) and optionally at least one herbicides B and/or safeners C, all solvents in the core, polyisocyate, and polyamine).

The average particle size $D_{50}$ of the microcapsules (determined according to ISO 13320, Particle Size Analysis—Laser Diffraction Methods, Dec. 1, 2009) is 0.5 to 100 µm, preferably 1 to 20 µm, more preferably 1 to 12 µm, and especially 2 to 10 µm.

The composition contains usually from 10 to 700 g/l of the microcapsules, preferably from 100 to 700 g/l, and in particular from 400 to 600 g/l.

The present invention furthermore relates to a method of preparing the aqueous composition according to the invention by synthesizing the microcapsules in the aqueous phase in the presence of the codispersant of the formula (I). In another form the present invention furthermore relates to a method of preparing microcapsules or composition comprising such microcapsules according to the invention by polycondensation of a polyisocyanate and a polyamine, optionally in the presence of the codispersant of the formula (A). Further details of the polycondensation are described above. Preferably, in the method of preparing the composition the aqueous phase comprises in emulsified form the water-immiscible solvent. Preferably, the microcapsules are synthesized by polycondensation of the polyisocyanate and the polyamine.

The term pesticide refers to at least one active substance selected from the group of the fungicides, insecticides, nematicides, herbicides, safeners, biopesticides and/or growth regulators.

Suitable pesticides are liquid or solid at 20° C. and atmospheric pressure. They are normally not volatile. For example, suitable pesticides have a vapor pressure below 0.1 mbar at 20° C., preferably below 0.01 mbar.

Preferred pesticides are fungicides, insecticides, herbicides and growth regulators. Especially preferred pesticides are fungicides. Mixtures of pesticides of two or more of the abovementioned classes may also be used. The skilled worker is familiar with such pesticides, which can be found, for example, in the Pesticide Manual, 17th Ed. (2015), The British Crop Protection Council, London. Suitable insecticides are insecticides from the class of the carbamates, organophosphates, organochlorine insecticides, phenylpyrazoles, pyrethroids, neonicotinoids, spinosins, avermectins, milbemycins, juvenile hormone analogs, alkyl halides, organotin compounds nereistoxin analogs, benzoylureas, diacylhydrazines, METI acarizides, and insecticides such as chloropicrin, pymetrozin, flonicamid, clofentezin, hexythiazox, etoxazole, diafenthiuron, propargite, tetradifon, chlorofenapyr, DNOC, buprofezine, cyromazine, amitraz, hydramethylnon, acequinocyl, fluacrypyrim, rotenone, or their derivatives. Suitable fungicides are fungicides from the classes of dinitroanilines, allylamines, anilinopyrimidines, antibiotics, aromatic hydrocarbons, benzenesulfonamides, benzimidazoles, benzisothiazoles, benzophenones, benzothiadiazoles, benzotriazines, benzyl carbamates, carbamates, carboxamides, carboxylic acid diamides, chloronitriles cyanoacetamide oximes, cyanoimidazoles, cyclopropanecarboxamides, dicarboximides, dihydrodioxazines, dinitrophenyl crotonates, dithiocarbamates, dithiolanes, ethylphosphonates, ethylaminothiazolecarboxamides, guanidines, hydroxy-(2-amino)pyrimidines, hydroxyanilides, imidazoles, imidazolinones, inorganic substances, isobenzofuranones, methoxyacrylates, methoxycarbamates, morpholines, N-phenylcarbamates, oxazolidinediones, oximinoacetates, oximinoacetamides, peptidylpyrimidine nucleosides, phenylacetamides, phenylamides, phenylpyrroles, phenylureas, phosphonates, phosphorothiolates, phthalamic acids, phthalimides, piperazines, piperidines, propionamides, pyridazinones, pyridines, pyridinylmethylbenzamides, pyrimidinamines, pyrimidines, pyrimidinonehydrazones, pyrroloquinolinones, quinazolinones, quinolines, quinones, sulfamides, sulfamoyltriazoles, thiazolecarboxamides, thiocarbamates, thiophanates, thiophenecarboxamides, toluamides, triphenyltin compounds, triazines, triazoles. Suitable herbicides are herbicides from the classes of the acetamides, amides, aryloxyphenoxypropionates, benzamides, benzofuran, benzoic acids, benzothiadiazinones, bipyridylium, carbamates, chloroacetamides, chlorocarboxylic acids, cyclohexanediones, dinitroanilines, dinitrophenyl, diphenyl ether, glycines, imidazolinones, isoxazoles, isoxazolidinones, nitriles, N-phenylphthalimides, oxadiazoles, oxazolidinediones, oxyacetamides, phenoxycarboxylic acids, phenylcarbamates, phenylpyrazoles, phenylpyrazolines, phenylpyridazines, phosphinic acids, phosphoroamidates, phosphorodithioates, phthalamates, pyrazoles, pyridazinones, pyridines, pyridinecarboxylic acids, pyridinecarboxamides, pyrimidinediones, pyrimidinyl(thio)benzoates, quinolinecarboxylic acids, semicarbazones, sulfonylaminocarbonyltriazolinones, sulfonylureas, tetrazolinones, thiadiazoles, thiocarbamates, triazines, triazinones, triazoles, triazolinones, triazolocarboxamides, triazolopyrimidines, triketones, uracils, ureas. Mixturs of pesticides are also suitable.

Preferably, the pesticide is soluble in water up to 30 g/l, preferably up to 10 g/l, and in particular up to 2 g/l, at 20° C. Mixtures of water soluble pesticides are also suitable.

In one form the pesticide is liquid at room temperature (e.g. 20° C.), like e.g. dimethenamide, dimethenamide-P, clomazone, S-metolachlor. In another form the pesticide also can have a melting point above room temperature, examples are pyraclostrobin 64° C., prochloraz 47° C., metrafenon 100° C., alphacypermethrin 79° C., pendimethalin 58° C. Mixturs of liquid pesticides are also suitable.

In another form the pesticide comprises a herbicide. Examples of herbicides B are:

b1) from the group of the lipid biosynthesis inhibitors:
ACC-herbicides such as alloxydim, alloxydim-sodium, butroxydim, clethodim, clodinafop, clodinafop-propargyl, cycloxydim, cyhalofop, cyhalofop-butyl, diclofop, diclofop-methyl, fenoxaprop, fenoxaprop-ethyl, fenoxaprop-P, fenoxaprop-P-ethyl, fluazifop, fluazifop-butyl, fluazifop-P, fluazifop-P-butyl, haloxyfop, haloxyfop-methyl, haloxyfop-P, haloxyfop-P-methyl, metamifop, pinoxaden, profoxydim, propaquizafop, quizalofop, quizalofop-ethyl, quizalofop-tefuryl, quizalofop-P, quizalofop-P-ethyl, quizalofop-P-tefuryl, sethoxydim, tepraloxydim, tralkoxydim, 4-(4'-Chloro-4-cyclopropyl-2'-fluoro[1,1'-biphenyl]-3-yl)-5-hydroxy-2,2,6,6-tetramethyl-2H-pyran-3(6H)-one (CAS 1312337-72-6); 4-(2',4'-Dichloro-4-cyclopropyl[1,1'-biphenyl]-3-yl)-5-hydroxy-2,2,6,6-tetramethyl-2H-pyran-3(6H)-one (CAS 1312337-45-3); 4-(4'-Chloro-4-ethyl-2'-fluoro[1,1'-biphenyl]-3-yl)-5-hydroxy-2,2,6,6-tetramethyl-2H-pyran-3(6H)-one (CAS 1033757-93-5); 4-(2',4'-Dichloro-4-ethyl[1,1-biphenyl]-3-yl)-2,2,6,6-tetramethyl-2H-pyran-3,5(4H,6H)-dione (CAS 1312340-84-3); 5-(Acetyloxy)-4-(4'-chloro-4-cyclopropyl-2'-fluoro[1,1'-biphenyl]-3-yl)-3,6-dihydro-2,2,6,6-tetramethyl-2H-pyran-3-one (CAS 1312337-48-6); 5-(Acetyloxy)-4-(2',4'-dichloro-4-cyclopropyl-[1,1'-biphenyl]-3-yl)-3,6-dihydro-2,2,6,6-tetramethyl-2H-pyran-3-one; 5-(Acetyloxy)-4-(4'-chloro-4-ethyl-2'-fluoro[1,1'-biphenyl]-3-yl)-3,6-dihydro-2,2,6,6-tetramethyl-2H-pyran-3-one (CAS 1312340-82-1); 5-(Acetyloxy)-4-(2',4'-dichloro-4-ethyl[1,1'-biphenyl]-3-yl)-3,6-dihydro-2,2,6,6-tetramethyl-2H-pyran-3-one (CAS 1033760-55-2); 4-(4'-Chloro-4-cyclopropyl-2'-fluoro[1,1'-biphenyl]-3-yl)-5,6-dihydro-2,2,6,6-tetramethyl-5-oxo-2H-pyran-3-yl carbonic acid methyl ester (CAS 1312337-51-1); 4-(2',4'-Dichloro-4-cyclopropyl-[1,1'-biphenyl]-3-yl)-5,6-dihydro-2,2,6,6-tetramethyl-5-oxo-2H-pyran-3-yl carbonic acid methyl ester; 4-(4'-Chloro-4-ethyl-2'-fluoro[1,1'-biphenyl]-3-yl)-5,6-dihydro-2,2,6,6-tetramethyl-5-oxo-2H-pyran-3-yl carbonic acid methyl ester (CAS 1312340-83-2); 4-(2',4'-Dichloro-4-ethyl[1,1-biphenyl]-3-yl)-5,6-dihydro-2,2,6,6-tetramethyl-5-oxo-2H-pyran-3-yl carbonic acid methyl ester (CAS 1033760-58-5); and non ACC herbicides such as benfuresate, butylate, cycloate, dalapon, dimepiperate, EPTC, esprocarb, ethofumesate, flupropanate, molinate, orbencarb, pebulate, prosulfocarb, TCA, thiobencarb, tiocarbazil, triallate and vernolate;

b2) from the group of the ALS inhibitors:
sulfonylureas such as amidosulfuron, azimsulfuron, bensulfuron, bensulfuron-methyl, chlorimuron, chlorimuron-ethyl, chlorsulfuron, cinosulfuron, cyclosulfamuron, ethametsulfuron, ethametsulfuron-methyl, ethoxysulfuron, flazasulfuron, flucetosulfuron, flupyrsulfuron, flupyrsulfuron-methyl-sodium, foramsulfuron, halosulfuron, halosulfuron-methyl, imazosulfuron, iodosulfuron, iodosulfuron-methyl-sodium, iofensulfuron, iofensulfuron-sodium, mesosulfuron, metazosulfuron, metsulfuron, metsulfuron-methyl, nicosulfuron, orthosulfamuron, oxasulfuron, primisulfuron, primisulfuron-methyl, propyrisulfuron, prosulfuron, pyrazosulfuron, pyrazosulfuron-ethyl, rimsulfuron, sulfometuron, sulfometuron-methyl, sulfosulfuron, thifensulfuron, thifensulfuron-methyl, triasulfuron, tribenuron, tribenuron-methyl, trifloxysulfuron, triflusulfuron, triflusulfuron-methyl and tritosulfuron, imidazolinones such as imazamethabenz, imazamethabenz-methyl, imazamox, imazapic, imazapyr, imazaquin and imazethapyr, triazolopyrimidine herbicides and sulfonanilides such as cloransulam, cloransulam-methyl, diclosulam, flumetsulam, florasulam, metosulam, penoxsulam, pyrimisulfan and pyroxsulam, pyrimidinylbenzoates such as bispyribac, bispyribac-sodium, pyribenzoxim, pyriftalid, pyriminobac, pyriminobac-methyl, pyrithiobac, pyrithiobac-sodium, 4-[[[2-[(4,6-dimethoxy-2-pyrimidinyl)oxy]phenyl]methyl] amino]-benzoic acid-1-methylethyl ester (CAS 420138-41-6), 4-[[[2-[(4,6-dimethoxy-2-pyrimidinyl) oxy]phenyl]methyl]amino]-benzoic acid propyl ester (CAS 420138-40-5), N-(4-bromophenyl)-2-[(4,6-dimethoxy-2-pyrimidinyloxy]benzenemethanamine (CAS 420138-01-8), sulfonylaminocarbonyl-triazolinone herbicides such as flucarbazone, flucarbazone-sodium, propoxycarbazone, propoxycarbazone-sodium, thiencarbazone and thiencarbazone-methyl; and triafamone;

among these, a preferred embodiment of the invention relates to those compositions comprising at least one imidazolinone herbicide;

b3) from the group of the photosynthesis inhibitors:
amicarbazone, inhibitors of the photosystem II, e.g. triazine herbicides, including of chlorotriazine, triazinones, triazindiones. methylthiotriazines and pyridazinones such as ametryn. atrazine, chloridazone, cyanazine, desmetryn, dimethametryn,hexazinone, metribuzin, prometon, prometryn, propazine, simazine, simetryn, terbumeton, terbuthylazin, terbutryn and trietazin, aryl urea such as chlorobromuron, chlorotoluron, chloroxuron, dimefuron, diuron, fluometuron, isoproturon, isouron, linuron, metamitron, methabenzthiazuron, metobenzuron. metoxuron, monolinuron, neburon, siduron. tebuthiuron and thiadiazuron, phenyl carbamates such as desmedipham, karbutilat, phenmedipham, phenmedipham-ethyl, nitrile herbicides such as bromofenoxim, bromoxynil and its salts and esters, ioxynil and its salts and esters, uraciles such as bromacil, lenacil and terbacil, and bentazon and bentazon-sodium, pyridate, pyridafol, pentanochlor and propanil and inhibitors of the photosystem I such as diquat, diquat-dibromide, paraquat, paraquat-dichloride and paraquat-dimetilsulfate. Among these, a preferred embodiment of the invention relates to those compositions comprising at least one aryl urea herbicide. Among these, likewise a preferred embodiment of the invention relates to those compositions comprising at least one triazine herbicide. Among these, likewise a preferred embodiment of the invention relates to those compositions comprising at least one nitrile herbicide;

b4) from the group of the protoporphyrinogen-IX oxidase inhibitors:

acifluorfen, acifluorfen-sodium, azafenidin, bencarbazone, benzfendizone, bifenox, butafenacil, carfentrazone, carfentrazone-ethyl, chlomethoxyfen, cinidon-ethyl, fluazolate, flufenpyr, flufenpyr-ethyl, flumiclorac, flumiclorac-pentyl, flumioxazin, fluoroglycofen, fluoroglycofen-ethyl, fluthiacet, fluthiacet-methyl, fomesafen, halosafen, lactofen, oxadiargyl, oxadiazon, oxyfluorfen, pentoxazone, profluazol, pyraclonil, pyraflufen, pyraflufen-ethyl, saflufenacil, sulfentrazone, thidiazimin, tiafenacil, trifludimoxazin, ethyl [3-[2-chloro-4-fluoro-5-(1-methyl-6-trifluoromethyl-2,4-dioxo-1,2,3,4-tetrahydropyrimidin-3-yl)phenoxy]-2-pyridyloxy]acetate (CAS 353292-31-6; S-3100, N-ethyl-3-(2,6-dichloro-4-trifluoromethylphenoxy)-5-methyl-1H-pyrazole-1-carboxamide (CAS 452098-92-9), N-tetrahydrofurfuryl-3-(2,6-dichloro-4-trifluoromethylphenoxy)-5-methyl-1H-pyrazole-1-carboxamide (CAS 915396-43-9), N-ethyl-3-(2-chloro-6-fluoro-4-trifluoromethyl-phenoxy)-5-methyl-1H-pyrazole-1-carboxamide (CAS 452099-05-7), N-tetrahydrofurfuryl-3-(2-chloro-6-fluoro-4-trifluoromethylphenoxy)-5-methyl-1H-pyrazole-1-carboxamide (CAS 452100-03-7), 3-[7-fluoro-3-oxo-4-(prop-2-ynyl)-3,4-dihydro-2H-benzo[1,4]oxazin-6-yl]-1,5-dimethyl-6-thioxo-[1,3,5]triazinan-2,4-dione (CAS 451484-50-7), 2-(2,2,7-trifluoro-3-oxo-4-prop-2-ynyl-3,4-dihydro-2H-benzo[1,4]oxazin-6-yl)-4,5,6,7-tetrahydro-isoindole-1,3-dione (CAS 1300118-96-0), 1-methyl-6-trifluoromethyl-3-(2,2,7-trifluoro-3-oxo-4-prop-2-ynyl-3,4-dihydro-2H-benzo[1,4]oxazin-6-yl)-1H-pyrimidine-2,4-dione (CAS 1304113-05-0), methyl (E)-4-[2-chloro-5-[4-chloro-5-(difluoromethoxy)-1H-methyl-pyrazol-3-yl]-4-fluoro-phenoxy]-3-methoxy-but-2-enoate (CAS 948893-00-3), and 3-[7-chloro-5-fluoro-2-(trifluoromethyl)-1H-benzimidazol-4-yl]-1-methyl-6-(trifluoromethyl)-1H-pyrimidine-2,4-dione (CAS 212754-02-4);

b5) from the group of the bleacher herbicides:

PDS inhibitors: beflubutamid, diflufenican, fluridone, flurochloridone, flurtamone, noillurazon, picolinafen, and 4-(3-trifluoromethylphenoxy)-2-(4-trifluoromethylphenyl)pyrimidine (CAS 180608-33-7), HPPD inhibitors: benzobicyclon, benzofenap, bicyclopyrone, clomazone, fenquinotrione, isoxaflutole, mesotrione, oxotrione (CAS 1486617-21-3), pyrasulfotole, pyrazolynate, pyrazoxyfen, sulcotrione, tefuryltrione, tembotrione, tolpyralate, topramezone, bleacher, unknown target: aclonifen, amitrole flumeturon and 2-chloro-3-methylsulfanyl-N-(1-methyltetrazol-5-yl)-4-(trifluoromethyl)benzamide (CAS 1361139-71-0);

b6) from the group of the EPSP synthase inhibitors:

glyphosate, glyphosate-isopropylammonium, glyposate-potas and glyphosate-trimesium (sulfosate);

b7) from the group of the glutamine synthase inhibitors:

bilanaphos (bialaphos), bilanaphos-sodium, glufosinate, glufo inate-P and glufosinate-ammonium;

b8) from the group of the DHP synthase inhibitors:

asulam;

b9) from the group of the mitosis inhibitors:

compounds of group K1: dinitroanilines such as benfluralin. butralin, dinitramine. ethalfluralin, fluchloralin, oryzalin, pendimethalin, prodiamine and trifluralin, phosphoramidates such as amiprophos, amiprophos-methyl, and butamiphos, benzoic acid herbicides such as chlorthal, chlorthal-dimethyl, pyridines such as dithiopyr and thiazopyr, benzamides such as propyzamide and tebutam; compounds of group K2: carbetamide, chlorpropham, flamprop, flamprop-isopropyl, flamprop-methyl, flamprop-M-isopropyl, flamprop-M-methyl and propham ; among these, compounds of group K1, in particular dinitroanilines are preferred;

b10) from the group of the VLCFA inhibitors:

chloroacetamides such as acetochlor, alachlor, amidochlor, butachlor, dimethachlor, dimethenamid, dimethenamid-P, metazachlor, metolachlor, metolachlor-S, pethoxamid, pretilachlor, propachlor, propisochlor and thenylchlor, oxyacetanilides such as flufenacet and mefenacet, acetanilides such as diphenamid, naproanilide, napropamide and napropamide-M, tetrazolinones such fentrazamide, and other herbicides such as anilofos, cafenstrole, fenoxasulfone, ipfencarbazone, piperophos, pyroxasulfone and isoxazoline compounds of the formulae II.1, II.2, II.3, II.4, II.5, II.6, II.7, II.8 and II.9

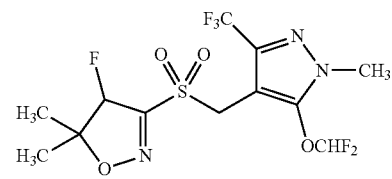

II.1

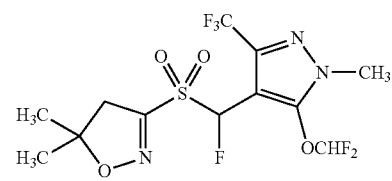

II.2

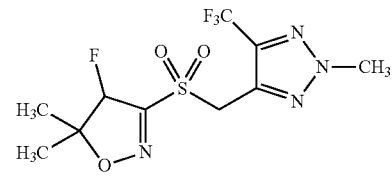

II.3

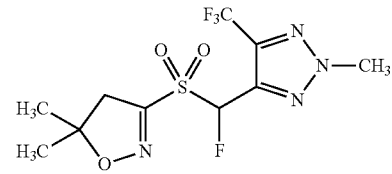

II.4

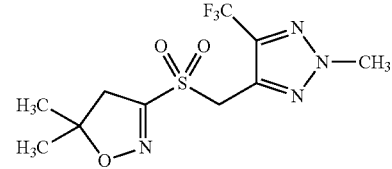

II.5

-continued

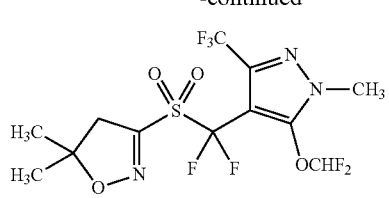
II.6

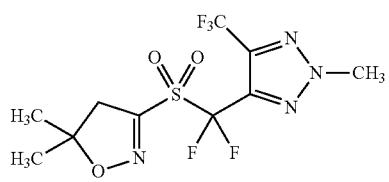
II.7

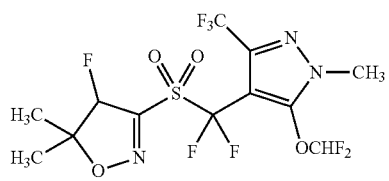
II.8

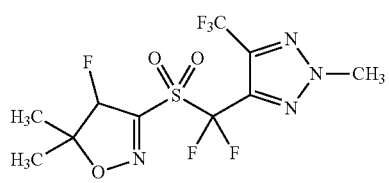
II.9 the isoxazoline compounds of the formula (I)I are known in the art, e.g. from WO 2006/024820, WO 2006/037945, WO 2007/071900 and WO 2007/096576;

among the VLCFA inhibitors, preference is given to chloroacetamides and oxyacetamides;

b11) from the group of the cellulose biosynthesis inhibitors:

chlorthiamid, dichlobenil, flupoxam, indaziflam, isoxaben, triaziflam and 1-cyclohexyl-5-pentafluorphenyloxy-$1^4$-[1,2,4,6]thiatriazin-3-ylamine (CAS 175899-01-1);

b12) from the group of the decoupler herbicides:

dinoseb, dinoterb and DNOC and its salts;

b13) from the group of the auxinic herbicides:

2,4-D and its salts and esters such as clacyfos, 2,4-DB and its salts and esters, aminocyclopyrachlor and its salts and esters, aminopyralid and its salts such as aminopyralid-dimethylammonium, aminopyralid-tris(2-hydroxypropyl)ammonium and its esters, benazolin, benazolin-ethyl, chloramben and its salts and esters, clomeprop, clopyralid and its salts and esters, dicamba and its salts and esters, dichlorprop and its salts and esters, dichlorprop-P and its salts and esters, flopyrauxifen, fluroxypyr, fluroxypyr-butometyl, fluroxypyr-meptyl, halauxifen and its salts and esters (CAS 943832-60-8; MCPA and its salts and esters, MCPA-thioethyl, MCPB and its salts and esters, mecoprop and its salts and esters, mecoprop-P and its salts and esters, picloram and its salts and esters, quinclorac, quinmerac, TBA (2,3,6) and its salts and esters, triclopyr and its salts and esters, florpyrauxifen, florpyrauxifen-benzyl (CAS 1390661-72-9) and 4-amino-3-chloro-5-fluoro-6-(7-fluoro-1H-indol-6-yl)picolinic acid (CAS 1629965-65-6);

b14) from the group of the auxin transport inhibitors: diflufenzopyr, diflufenzopyr-sodium, naptalam and naptalam-sodium;

b15) from the group of the other herbicides: bromobutide, chlorflurenol, chlorflurenol-methyl, cumyluron, cyclopyrimorate (CAS 499223-49-3) and its salts and esters, dalapon, dazomet, difenzoquat, difenzoquat-metilsulfate, dimethipin, DSMA, dymron, endothal and its salts, etobenzanid, flurenol, flurenol-butyl, flurprimidol, fosamine, fosamine-ammonium, indanofan, maleic hydrazide, mefluidide, metam, methiozolin (CAS 403640-27-7), methyl azide, methyl bromide, methyl-dymron, methyl iodide, MSMA, oleic acid, oxaziclomefone, pelargonic acid, pyributicarb, quinoclamine and tridiphane.

Preferably, the pesticide comprises a herbicide. In particular, the pesticide comprises a chloroacetamide.

In another preferred form the pesticide comprises dimethenamid, dimethenamid-P, acetochlor, alachlor, metolachlor, S-metolachlor, clomazone, butachlor or pendimethalin.

In a particular preferred form the pesticide comprises dimethenamide-P.

The composition may comprise a non-encapsulated pesticide (e.g. herbicide). This non-encapsulated pesticide may be present in dissolved form, or as a suspension, emulsion or suspoemulsion. It may be identical or different to the pesticide in the core. The aqueous composition contains usually at least 1 wt % non-encapsulated pesticide, preferably at least 3 wt % and in particular at least 10 wt %.

The aqueous composition contains usually at least 1 wt % encapsulated pesticide, preferably at least 3 wt % and in particular at least 10 wt %.

The aqueous compositions may also comprise auxiliaries which are customary in agrochemical formulations. The auxiliaries used depend on the particular application form and active substance, respectively. Examples for suitable auxiliaries are dispersants or emulsifiers (such as further solubilizers, protective colloids, surfactants and adhesion agents), organic and anorganic thickeners, bactericides, anti-freezing agents, anti-foaming agents, if appropriate colorants and tackifiers or binders (e. g. for seed treatment formulations).

The auxiliaries are usually different from the sulfonate and the codispersant of the formula (I).

Examples for suitable auxiliaries are solvents, liquid carriers, solid carriers or fillers, surfactants, further dispersants, emulsifiers, wetters, further adjuvants, solubilizers, penetration enhancers, protective colloids, adhesion agents, thickeners, humectants, repellents, attractants, feeding stimulants, compatibilizers, bactericides, anti-freezing agents, anti-foaming agents, colorants, tackifiers and binders.

Suitable surfactants are surface-active compounds, such as anionic, cationic, nonionic and amphoteric surfactants, block polymers, polyelectrolytes, and mixtures thereof. Such surfactants can be used as emusifier, dispersant, solubilizer, wetter, penetration enhancer, protective colloid, or adjuvant. Examples of surfactants are listed in McCutcheon's, Vol.1: Emulsifiers & Detergents, McCutcheon's Directories, Glen Rock, USA, 2008 (International Ed. or North American Ed.).

The composition may comprise a sulfonate dispersant selected from lignosulfonate, naphthalene sulfonate formaldehyde condensate, or mixtures thereof. Preferably, the sulfonate dispersant is selected from lignosulfonate or mixtures of lignosulfonate and naphthalene sulfonate formaldehyde condensate. In particular, the sulfonate dispersant is lignosulfonate.

Lignosulfonates are known and are defined, for example, in Roempp's dictionary of chemistry, 9th Edition, volume 3, Georg-Thieme Verlag, Stuttgart, New York 1990, page 2511. Lignosulfonates which are suitable are the alkali metal salts and/or alkaline earth metal salts and/or ammonium salts, for example the ammonium, sodium, potassium, calcium or magnesium salts of lignosulfonic acid. The sodium, potassium or calcium salts are preferably used, the sodium, potassium and/or calcium salts are very particularly preferably used. Naturally, the term lignosulfonates also encompasses mixed salts of different ions, such as potassium/sodium lignosulfonate, potassium/calcium lignosulfonate and the like, in particular sodium/calcium lignosulfonate. The molecular mass of the lignosulfonate may vary from 500 to 200,000 Da. Preferably, the lignosulfonate has a molecular weight of 700 to 50,000 Da, more preferably from 900 to 20,000 Da, and in particular from 1000 to 10,000 Da. The lignosulfonate is usually soluble in water (e.g. at 20° C.), e.g. at least 5 wt %, preferably at least 10 wt %, and in particular at least 20 wt %.

Naphthalene sulfonate formaldehyde condensates are oligomers obtainable by reaction (e.g. polycondensation) of naphthalene sulfonate and formaldehyde. The naphthalene sulfonate formaldehyde condensates has usually a molecular mass of 300 to 10,000 Da, preferably of 500 to 5000 Da, and in particular of 500 to 2500 Da. The naphthalene group may optionally substituted by a linear or branched $C_1$-$C_8$ alkyl. The naphthalene sulfonate formaldehyde condensates is usually soluble in water (e.g. at 20° C.), e.g. at least 5 wt %, preferably at least 10 wt %, and in particular at least 20 wt %. Naphthalene sulfonate formaldehyde condensates which are suitable are the alkali metal salts and/or alkaline earth metal salts and/or ammonium salts, for example the ammonium, sodium, potassium, calcium or magnesium salts of lignosulfonic acid. The sodium, potassium or calcium salts are preferably used, the sodium, potassium and/or calcium salts are very particularly preferably used.

The composition may comprise from 0,05 to 15 wt %, preferably from 0,1 to 5 wt %, and in particular from 0,3 to 3 wt % of the sufonate dispersant (e.g. the lignosulfonate).

The weight ratio of the sufonate dispersant (e.g. the lignosulfonate) to the codispersant may vary from 10:1 to 1:8, preferably from 6:1 to 1:4, and in particular from 4:1 to 1:1.

Suitable nonionic surfactants are alkoxylate surfactants, N-subsituted fatty acid amides, amine oxides, esters, sugar-based surfactants, polymeric surfactants, and mixtures thereof. Examples of alkoxylate surfactants are compounds such as alcohols, alkylphenols, amines, amides, arylphenols, fatty acids or fatty acid esters which have been alkoxylated with 1 to 50 equivalents. Ethylene oxide and/or propylene oxide may be employed for the alkoxylation, preferably ethylene oxide. Examples of N-subsititued fatty acid amides are fatty acid glucamides or fatty acid alkanolamides. Examples of esters are fatty acid esters, glycerol esters or monoglycerides. Examples of sugar-based surfactants are sorbitans, ethoxylated sorbitans, sucrose and glucose esters or alkylpolyglucosides. Examples of polymeric surfactants are homo- or copolymers of vinylpyrrolidone, vinylalcohols, or vinylacetate.

Suitable cationic surfactants are quaternary surfactants, for example quaternary ammonium compounds with one or two hydrophobic groups, or salts of long-chain primary amines. Suitable amphoteric surfactants are alkylbetains and imidazolines. Suitable block polymers are block polymers of the A-B or A-B-A type comprising blocks of polyethylene oxide and polypropylene oxide, or of the A-B-C type comprising alkanol, polyethylene oxide and polypropylene oxide. Suitable polyelectrolytes are polyacids or polybases. Examples of polyacids are alkali salts of polyacrylic acid or polyacid comb polymers. Examples of polybases are polyvinylamines or polyethyleneamines.

Suitable further adjuvants are compounds, which have a neglectable or even no pesticidal activity themselves, and which improve the biological performance of the pesticide on the target. Examples are surfactants, mineral or vegetable oils, and other auxiliaries. Further examples are listed by Knowles, Adjuvants and additives, Agrow Reports DS256, T&F Informa UK, 2006, chapter 5. Suitable thickeners are polysaccharides (e.g, xanthan gum, carboxymethylcellulose), anorganic clays (organically modified or unmodified), polycarboxylates, polyethers, isocyanate-linked polyethers, polyvinyl alcohols, and silicates. Suitable bactericides are bronopol and isothiazolinone derivatives such as alkylisothiazolinones and benzisothiazolinones. Suitable anti-freezing agents are ethylene glycol, propylene glycol, urea and glycerin. Suitable anti-foaming agents are silicones, long chain alcohols, and salts of fatty acids. Suitable colorants (e.g. in red, blue, or green) are pigments of low water solubility and water-soluble dyes. Examples are inorganic colorants (e.g. iron oxide, titan oxide, iron hexacyanoferrate) and organic colorants (e.g. alizarin-, azo- and phthalocyanine colorants). Suitable tackifiers or binders are polyvinylpyrrolidons, polyvinylacetates, polyvinyl alcohols, polyacrylates, biological or synthetic waxes, and cellulose ethers.

The composition comprises usually less than 1.0 wt %, preferably less than 0.5 wt %, and in particular less than 0.1 wt % of a hydrophobic surfactant. In another particular preferred form the composition is essentially free of a hydrophobic surfactant.

The hydrophobic surfactant is usually a compound of the formula (II)

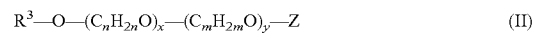

$$R^3\text{—O—}(C_nH_{2n}O)_x\text{—}(C_mH_{2m}O)_y\text{—Z} \qquad (II)$$

in which
$R^3$ is a $C_{11}$-$C_{40}$ unit (e.g. $C_{11}$-$C_{40}$ alkyl, $C_{11}$-$C_{40}$ aryl or $C_{11}$-$C_{40}$ alkyaryl);
Z is —P(O)($R^a$)(OH), —$CH_2$—$CH_2$—$PO_3H_2$, —$CH_2$—$CH_2$—$CO_2H$, —$SO_3H$, —$CH_2$—$CH_2CH_2$—$SO_3H$, or salts thereof;
$R^a$ is $R^3$—O—$(C_nH_{2n}O)_x$—$(C_mH_{2m}O)_y$— or —OH;
n, m independently of one another are a value of from 2 to 6;
x, y independently of one another are a value of from 0 to 100; and
x+y gives a value of from 1 to 100.

The hydrophobic surfactant is in another form a compound of the formula (III)

$$R^2\text{—Y} \qquad (III)$$

in which
$R^2$ is a $C_{11}$-$C_{40}$ unit (e.g. $C_{11}$-$C_{40}$ alkyl, $C_{11}$-$C_{40}$ aryl or $C_{11}$-$C_{40}$ alkyaryl);
Y is —O—$PO_3H_2$, —$CO_2H$, —O—$SO_3H$, —$SO_3H$, or salts thereof.

In a preferred form the composition comprises less than 1.0 wt %, preferably less than 0.5 wt %, and in particular it is free of the hydrophobic surfactant, and in the codispersant R is linear or branched hexyl, heptyl, octyl, nonyl or decyl, methylphenyl, ethylphenyl, propylphenyl (e.g. cumyl), butylphenyl, or mixture thereof; and X is —O—PO$_3$H$_2$, —CO$_2$H, —O—SO$_3$H, —SO$_3$H, or salts thereof.

In another preferred form the composition comprises less than 1.0 wt %, preferably less than 0.5 wt %, and in particular it is free of the hydrophobic surfactant, and in the codispersant R is linear or branched hexyl, heptyl, octyl, methylphenyl, ethylphenyl, propylphenyl (e.g. cumyl) or mixture thereof; and X is —O—PO$_3$H$_2$, —CO$_2$H, —O—SO$_3$H, —SO$_3$H, or salts thereof.

In another preferred form the composition comprises less than 1.0 wt %, preferably less than 0.5 wt %, and in particular it is free of the hydrophobic surfactant, and in the codispersant R is linear or branched hexyl, heptyl, octyl, nonyl or decyl, methylphenyl, ethylphenyl, propylphenyl (e.g. cumyl), butylphenyl, or mixture thereof; and X is —O—PO$_3$H$_2$, —CO$_2$H, —O—SO$_3$H, —SO$_3$H, or salts thereof, and the weight ratio of the microcapsules to the codispersant is in the range from 400:1 to 20:1, preferably from 200:1 to 40:1, and in particular from 150:1 to 60:1.

In another preferred form the composition comprises less than 1.0 wt %, preferably less than 0.5 wt %, and in particular it is free of the hydrophobic surfactant, and in the codispersant R is linear or branched hexyl, heptyl, octyl, methylphenyl, ethylphenyl, propylphenyl (e.g., cumyl) or mixture thereof; and X is —O—PO$_3$H$_2$, —CO$_2$H, —O—SO$_3$H, —SO$_3$H, or salts thereof, and the weight ratio of the microcapsules to the codispersant is in the range from 400:1 to 20:1, preferably from 200:1 to 40:1, and in particular from 150:1 to 60:1.

In another preferred form the composition comprises less than 1.0 wt %, preferably less than 0.5 wt %, and in particular it is free of the hydrophobic surfactant, and in the codispersant R is linear or branched hexyl, heptyl, octyl, nonyl or decyl, methylphenyl, ethylphenyl, propylphenyl (e.g. cumyl), butylphenyl, or mixture thereof; and X is —O—PO$_3$H$_2$, —CO$_2$H, —O—SO$_3$H, —SO$_3$H, or salts thereof, and the weight ratio of the microcapsules to the codispersant is in the range from 400:1 to 20:1, preferably from 200:1 to 40:1, and in particular from 150:1 to 60:1

In another preferred form the composition comprises less than 1.0 wt %, preferably less than 0.5 wt %, and in particular it is free of the hydrophobic surfactant, and in the codispersant R is linear or branched hexyl, heptyl, octyl, methylphenyl, ethylphenyl, propylphenyl (e.g. cumyl) or mixture thereof; and X is —O—PO$_3$H$_2$, —CO$_2$H, —O—SO$_3$H, —SO$_3$H, or salts thereof.

In another preferred form the composition comprises less than 1.0 wt %, preferably less than 0.5 wt %, and in particular it is free of the hydrophobic surfactant, and in the codispersant R is branched hexyl, heptyl, octyl, cumyl or mixture thereof; and X is —O—SO$_3$H or salts thereof when R is branched hexyl, heptyl, octyl, and X is —SO$_3$H, or salts thereof when R is cumyl In another preferred form the composition comprises less than 1.0 wt %, preferably less than 0.5 wt %, and in particular it is free of the hydrophobic surfactant, and in the codispersant R is linear or branched hexyl, heptyl, octyl, methylphenyl, ethylphenyl, propylphenyl (e.g. cumyl) or mixture thereof; and X is —O—PO$_3$H$_2$, —CO$_2$H, —O—SO$_3$H, —SO$_3$H, or salts thereof, and the weight ratio of the microcapsules to the codispersant is in the range from 400:1 to 20:1, preferably from 200:1 to 40:1, and in particular from 150:1 to 60:1

In another preferred form the composition comprises less than 1.0 wt %, preferably less than 0.5 wt %, and in particular it is free of the hydrophobic surfactant, and in the codispersant R is branched hexyl, heptyl, octyl, cumyl or mixture thereof; and X is —O—SO$_3$H or salts thereof when R is branched hexyl, heptyl, octyl, and X is —SO$_3$H, or salts thereof when R is cumyl, and the weight ratio of the microcapsules to the codispersant is in the range from 400:1 to 20:1, preferably from 200:1 to 40:1, and in particular from 150:1 to 60:1

In another preferred form the composition comprises less than 1.0 wt %, preferably less than 0.5 wt %, and in particular it is free of the hydrophobic surfactant, and in the codispersant R is linear or branched hexyl, heptyl, octyl, methylphenyl, ethylphenyl, propylphenyl (e.g. cumyl) or mixture thereof; and X is —O—PO$_3$H$_2$, —CO$_2$H, —O—SO$_3$H, —SO$_3$H, or salts thereof, and the weight ratio of the microcapsules to the codispersant is in the range from 400:1 to 20:1, preferably from 200:1 to 40:1, and in particular from 150:1 to 60:1

In another preferred form

R is linear or branched hexyl, heptyl, octyl, propylphenyl (e.g, cumyl) or mixture thereof; and X is —O—SO$_3$H or salts thereof when R is linear or branched hexyl, heptyl, octyl, and X is —SO$_3$H, or salts thereof when R is propylphenyl, and the weight ratio of the microcapsules to the codispersant is in the range from 400:1 to 20:1, preferably from 200:1 to 40:1, and in particular from 150:1 to 60:1

In another preferred form

R is branched hexyl, heptyl, octyl, cumyl or mixture thereof; and

X is —O—SO$_3$H or salts thereof when R is branched hexyl, heptyl, octyl, and X is —SO$_3$H, or salts thereof when R is cumyl, and the weight ratio of the microcapsules to the codispersant is in the range from 400:1 to 20:1, preferably from 200:1 to 40:1, and in particular from 150:1 to 60:1

When employed in plant protection, the amounts of active substances applied are, depending on the kind of effect desired, from 0.001 to 6 kg per ha, preferably from 0.005 to 2 kg per ha, more preferably from 0.05 to 0.9 kg per ha, in particular from 0.1 to 0.75 kg per ha.

In treatment of plant propagation materials such as seeds, e.g., by dusting, coating or drenching seed, amounts of active substance of from 0.1 to 1000 g, preferably from 1 to 1000 g, more preferably from 1 to 100 g and most preferably from 5 to 100 g, per 100 kilogram of plant propagation material (preferably seed) are generally required.

When used in the protection of materials or stored products, the amount of active substance applied depends on the kind of application area and on the desired effect. Amounts customarily applied in the protection of materials are 0.001 g to 2 kg, preferably 0.005 g to 1 kg, of active substance per cubic meter of treated material.

Various types of oils, wetters, adjuvants, fertilizer, or micronutrients, and other pesticides (e.g. herbicides, insecticides, fungicides, growth regulators, safeners) may be added to the active substances or the compositions comprising them as premix or, if appropriate not until immediately prior to use (tank mix). These agents can be admixed with the compositions according to the invention in a weight ratio of 1:100 to 100:1, preferably 1:10 to 10:1.

The concentration of the codispersant of the formula (I) in the ready-to-use preparation (e.g. the tank mix) is in most cases in the range of from 0.01 to 50 g/l, preferably 0.08 to 10 g/l and in particular 0.5 to 8 g/l.

The concentration of water in the ready-to-use preparation (e.g. the tank mix) is in most cases at least 60 wt %, preferably at least 75 wt %, and in particular at least 90 wt %.

The tank mix is usually an aqueous liquid, which is ready to be applied (e.g. by spraying) in the method of controlling phytopathogenic fungi and/or undesired vegetation and/or undesired insect or mite attack and/or for regulating the growth of plants.

The user applies the composition according to the invention usually from a predosage device, a knapsack sprayer, a spray tank, a spray plane, or an irrigation system. Usually, the agrochemical composition is made up with water, buffer, and/or further auxiliaries to the desired application concentration and the ready-to-use spray liquor or the agrochemical composition according to the invention is thus obtained. Usually, 20 to 2000 liters, preferably 50 to 400 liters, very preferably 50 to 200 liters of the ready-to-use spray liquor are applied per hectare of agricultural useful area.

In a further embodiment, either individual components of the composition according to the invention or partially premixed components, e.g., components comprising the pesticide and the adjuvant, may be mixed by the user in a spray tank and further auxiliaries and additives may be added, if appropriate. In a further embodiment, either individual components of the composition according to the invention or partially premixed components, e.g., components comprising the pesticide and/or the adjuvant can be applied jointly (e.g. after tank mix) or consecutively.

The present invention furthermore relates to a method of controlling phytopathogenic fungi and/or undesired plant growth and/or undesired insect or mite attack and/or for regulating the growth of plants, wherein the composition comprising the pesticide and the alkoxylate of the formula (I) according to the invention are allowed to act on the respective pests, their environment or the crop plants to be protected from the respective pest, on the soil and/or on undesired plants and/or on the crop plants and/or on their environment.

The present invention furthermore relates to a method of controlling phytopathogenic fungi and/or undesired plant growth and/or undesired insect or mite attack and/or for regulating the growth of plants, wherein a composition comprising a pesticide and the adjuvants of the formula (I) according to the invention are allowed to act on the respective pests, their environment or the crop plants to be protected from the respective pest, on the soil and/or on undesired plants and/or on the crop plants and/or on their environment. In another form the present invention furthermore relates to a method of controlling undesired vegetation, which comprises allowing microcapsules, or composition comprising such microcapsules, comprising a herbicidal active amount of at least one benzoxazinones of the formula (I) to act on plants, their environment or on seed.

Examples of suitable crop plants are cereals, for example wheat, rye, barley, triticale, oats or rice; beet, for example sugar or fodder beet; pome fruit, stone fruit and soft fruit, for example apples, pears, plums, peaches, almonds, cherries, strawberries, raspberries, currants or gooseberries; legumes, for example beans, lentils, peas, lucerne or soybeans; oil crops, for example oilseed rape, mustard, olives, sunflowers, coconut, cacao, castor beans, oil palm, peanuts or soybeans; cucurbits, for example pumpkins/squash, cucumbers or melons; fiber crops, for example cotton, flax, hemp or jute; citrus fruit, for example oranges, lemons, grapefruit or tangerines; vegetable plants, for example spinach, lettuce, asparagus, cabbages, carrots, onions, tomatoes, potatoes, pumpkin/squash or capsicums; plants of the laurel family, for example avocados, cinnamon or camphor; energy crops and industrial feedstock crops, for example maize, soybeans, wheat, oilseed rape, sugar cane or oil palm; maize; tobacco; nuts; coffee; tea; bananas; wine (dessert grapes and grapes for vinification); hops; grass, for example turf; sweetleaf (*Stevia rebaudania*); rubber plants and forest plants, for example flowers, shrubs, deciduous trees and coniferous trees, and propagation material, for example seeds, and harvested produce of these plants.

The term crop plants also includes those plants which have been modified by breeding, muta-genesis or recombinant methods, including the biotechnological agricultural products which are on the market or in the process of being developed. Genetically modified plants are plants whose genetic material has been modified in a manner which does not occur under natural conditions by hybridizing, mutations or natural recombination (i.e. recombination of the genetic material). Here, one or more genes will, as a rule, be integrated into the genetic material of the plant in order to improve the plant's properties. Such recombinant modifications also comprise posttranslational modifications of proteins, oligo- or polypeptides, for example by means of glycosylation or binding polymers such as, for example, prenylated, acetylated or farnesylated residues or PEG residues.

The present invention also relates to seed (such as seeds or other plant propagation materials) comprising the composition according to the invention. Plant propagation materials can be treated preventively with the composition according to the invention at the point of or even before sowing or at the point of or even before transplanting. For the treatment of seed, one will generally use water-soluble concentrates (LS), suspensions (FS), dusts (DS), water-dispersible and water-soluble powders (WS, SS), emulsions (ES), emulsifiable concentrates (EC) and gels (GF). These compositions can be applied to the propagation materials, in particular seed, in undiluted form or, preferably, in diluted form. Here, the composition in question can be diluted 2- to 10-fold, so that from 0.01 to 60% by weight, preferably from 0.1 to 40% by weight, of active substance is present in the compositions used for the seed dressing. The application may be effected before or during sowing. The treatment of plant propagation material, in particular the treatment of seed, is known to the skilled worker and carried out by dusting, coating, pelleting, dipping or soaking the plant propagation material, the treatment preferably being carried out by pelleting, coating and dusting or by in-furrow treatment so that, for example, untimely early germination of the seed is prevented. It is preferred to use suspensions for the treatment of seed. Usually, such compositions comprise from 1 to 800 g/l of active substance, from 1 to 200 g/l of surfactants, from 0 to 200 g/l of antifreeze agents, from 0 to 400 g/l of binders, from 0 to 200 g/l of colorants and solvent, preferably water.

The advantages of the invention are that the average particle size D50 of the microcapsules can be very low; that the average particle size D50 of the microcapsules can be very narrow; that when the microcapsules are synthesized a high percentage of the pesticides is encapsulated; that the pesticide is released over a long period; that the composition exhibits a reduced phytotoxicity.

The examples which follow illustrate the invention without posing any limitation.

EXAMPLES

Lignosulfonate: sodium lignine sulfonate, powder, soluble in water, average molecular weight 2700-3100 Da, total sulfur about 10-11%.

Polyisocyanate A: polyisocyanate based on 4,4'-diphenyl-methane diisocyanate (MDI) containing oligomers of high functionality and isomers, solvent-free liquid, average functionality 2.7, NCO-content 32 g/100 g.

Biocide: Mix of 2-methyl-4-isothiazolin-3-one and 1,2-benzisothiazolin-3-one.

Defoamer: Silicone based defoamer.

Codispersant A: $C_{12}$-$C_{14}$ Alkyl ether sulfate, ethoxylated with 25-25 mols ethylene oxide, sodium salt, about 30 wt % dissolved in water.

Codispersant B: $C_{12}$-$C_{14}$ Alkyl ether sulfate, ethoxylated with 2 mols ethylene oxide, sodium salt, about 25 wt % dissolved in water.

Codispersant C: Lauryl sulfate, sodium salt.

Codispersant D: Alkyl naphthalenesulfonic acid condensate, sodium salt, 30% in water.

Particle Size Analysis

The particle size distribution has been determined by static laser scattering with a Malvern Mastersizer 3000 according to the European norm ISO 13320 EN. The data were treated according to the Mie-Theory by a software provided by Malvern Instruments. In this software "universal model" and "Fraunhofer mode" was chosen. Important parameters are the dn-values which denote the scattering diameter, below which n vol.-% are found. Especially important are the d-values for n=50 and 90, the d50 and d90-values. Since the formulation has to be sprayable in an agronomic process, the d50 should be in the range of 10 μm or below and the d90 in the range of 30 μm or below.

Determination of Encapsulation Quality

To 200 ml water was added a small quantity of microcapsule formulation, in an amount to yield exactly 100 ppm total dimethenamide-P in water. Subsequently, the suspension was shaken for 10 minutes, then a small sample A was drawn through a 0.2 μm Teflon filter to remove intact microcapsules. In the filtrate A the amount of dimethenamide-P was determined by reverse phase HPLC and the free dmtap calculated: Free dmtap=ppm dmta-p in sample A/100 ppm×100%; or Free clo=ppm clo in sample A/20 ppm×100%. The percentage of free dimethena-mid-P (dmtap) or free clomazone (clo) was given in Table 1 or 2. Good microencapsulated formulations yield low values around or less than 10% for both values.

Example 1

Preparation of the water phase: To about 90 wt % of the necessary water were added the Lignosulfonate (final concentration 14 g/l), the Codispersants A-D or sodium 2-ethylhexyl sulfate, and the pH adjusted with KOH to about 11.5, if necessary.

Preparation of the oil phase: 1142 g Dimethenamide-P was mixed with Polyisocyanate A and optional with clomazone.

Preparation of the amine phase: A 25 w % solution of 1,6-hexamethylene diamine or diethylene triamine in water was prepared.

Finish solution: A slurry of Biocide, xanthan gum, Defoamer, and 1,2-propylene glycol antifreeze in water was prepared.

Preparation of the emulsion and encapsulation: Above oil phase and water phase were pumped (each 30 ml/min) at room temperature through a colloid mill with MK rotor tool at 5000 1/min, Beyond the mill, the emulsion is passed through a continuously stirred tank reactor, where the amine phase is added continuously in the appropriate amount, and the stream is heated to the curing temperature of about 50° C. Then, the product is collected in a vessel and cured for 1 h at about 50° C. After curing, the capsule suspension is cooled down and the finish phase is added batchwise upon stirring to arrive at a final concentration of 2 g/l Biocide, 1 g/l xanthan gum, 55 g/l antifreeze.

The composition and the analytical results were summarized in Table 1. The compositions "Comp-1" to "Comp-4" are comparative data.

The data showed that when instead of the C8 alkyl sulfate other dispersants were used a large amount of pesticide remained outside the capsules or the encapsulation did not work at all. The data also showed that when instead of the C8 alkyl sulfate other dispersants were used the particle size increased to a size which typically results in clogging of pesticidal sprayers.

TABLE 1

(all concentrations in g/l):

| | A | Comp-1 | Comp-2 | Comp-3 | Comp-4 |
|---|---|---|---|---|---|
| Dimethenamid-P | 460 | 460 | 460 | 460 | 460 |
| Polyisocyanate A | 18.7 | 18.7 | 18.7 | 18.7 | 18.7 |
| Hexamethylene diamine | 6.6 | 6.6 | 6.6 | 6.6 | 6.6 |
| Lignosulfonate | 13.8 | 13.8 | 13.8 | 13.8 | 13.8 |
| Sodium 2-ethylhexyl sulfate | 5.0 | — | — | — | — |
| Codispersant A | — | — | 10 | 3 | — |
| Codispersant B | — | 20 | — | — | — |
| Codispersant C | — | — | 10 | — | — |
| Codispersant D | — | — | — | 7.4 | 7.4 |
| Free Pesticide [wt %] | 2 | n/a [a] | 36 | 33 | n/a [a] |
| D50 [μm] | 8.7 | n/a [a] | 14 | 12 | n/a [a] |
| D90 [μm] | 19 | n/a [a] | 29 | 41 [b] | n/a [a] |

[a] The water and the oil phase did not emusify during the preparation, thus no microcapsules were formed.
[b] multimodal particle size distribution Example 2

The microcapsules were prepared as described in Example 1. As second pesticide clomazone was added. The composition and the analytical results were summarized in Table 2.

TABLE 2

| (all concentrations in g/l): | B | C |
|---|---|---|
| Dimethenamid-P | 400 | 400 |
| Clomazone | 80 | 80 |
| Polyisocyanate A | 18.7 | 18.7 |
| Hexamethylene diamine | 6.6 | — |
| Diethylenen triamine | — | 4.7 |
| Lignosulfonate | 13.8 | 13.8 |
| Sodium 2-ethylhexyl sulfate | 5.0 | 5.0 |
| Free Dimethenamid [wt %] | 7 | 6 |
| Free Clomazone [wt %] | 9 | 11 |
| D50 [μm] | 9.6 | 9.3 |
| D90 [μm] | 18 | 18 |

The invention claimed is:

1. A composition comprising, in an aqueous phase, microcapsules which comprise a shell and a core, where the core contains a pesticide;
a sulfonate dispersant; and
a codispersant of formula (I)

$$R\text{—}X \qquad (I)$$

in which
R has 6 to 10 carbon atoms and is alkyl, arylalkyl, or alkylaryl;
X is —O—PO$_3$H$_2$, —CO$_2$H, —O—SO$_3$H, —SO$_3$H, or salts thereof,
wherein the shell of the microcapsules is a polyurea shell.

2. The composition of claim 1, wherein R is C$_6$-C$_8$ alkyl or C$_8$-C$_{10}$ alkylaryl.

3. The composition of claim 1, wherein R is linear or branched C$_8$ alkyl or C$_9$ alkylaryl.

4. The composition of claim 1, wherein R is branched C$_8$ alkyl or (CH$_3$)$_2$CH-Ph-.

5. The composition of claim 1, wherein X is —O—SO$_3$H, —SO$_3$H or salts thereof.

6. The composition of claim 1, wherein the microcapsules have an average particle size D$_{50}$ of 1 to 20 μm.

7. The composition of claim 1, comprising 0.5 to 50 g/l of the codispersant.

8. The composition of claim 1, comprising 10 to 700 g/l of the microcapsules.

9. The composition of claim 1, wherein the weight ratio of the microcapsules to the codispersant is in the range from 200:1 to 40:1.

10. The composition of claim 1, which is free of a hydrophobic surfactant.

11. A method of controlling phytopathogenic fungi and/or undesired plant growth and/or undesired insect or mite attack and/or for regulating the growth of plants, wherein the composition of claim 1 is allowed to act on the respective pests, their environment or the crop plants to be protected from the respective pest, on the soil and/or on undesired plants and/or on the crop plants and/or on their environment.

12. The method of claim 11, wherein R is C$_6$-C$_8$ alkyl or C$_8$-C$_{10}$ alkylaryl.

13. The method of claim 11, wherein R is linear or branched C$_8$ alkyl or C$_9$ alkylaryl.

14. The method of claim 11, wherein R is branched C$_8$ alkyl or (CH$_3$)$_2$CH-Ph-.

15. The method of claim 11, wherein X is —O—SO$_3$H, —SO$_3$H or salts thereof.

16. The method of claim 11, wherein the microcapsules have an average particle size D$_{50}$ of 1 to 20 μm.

17. The method of claim 11, comprising 0.5 to 50 g/l of the codispersant.

18. The method of claim 11, comprising 10 to 700 g/l of the microcapsules.

19. The method of claim 11, wherein the weight ratio of the microcapsules to the codispersant is in the range from 200:1 to 40:1.

20. The method of claim 11, which is free of a hydrophobic surfactant.

21. The composition of claim 1 wherein the sulfonate dispersant is selected from the group consisting of a lignosulfonate, a naphthalene sulfonate formaldehyde condensate, and mixtures thereof.

22. The composition of claim 1 wherein the sulfonate dispersant comprises a lignosulfonate.

23. The composition of claim 22 wherein the lignosulfonate is an alkali metal salt, alkaline earth metal salt, an ammonium salt, or a mixture thereof.

24. The composition of claim 1 wherein the sulfonate dispersant is present in an amount of 0.05 to 15 wt % of the composition.

25. The composition of claim 1 wherein a weight ratio of the sulfonate dispersant to the codispersant is from 10:1 to 1:8.

26. The composition of claim 25 wherein the weight ratio of the sulfonate dispersant to the codispersant is from 6:1 to 1:4.

* * * * *